United States Patent [19]

Faust et al.

[11] 3,843,767

[45] Oct. 22, 1974

[54] PROCESS FOR TREATING FLUOPHOSPHATE ORES

[75] Inventors: Carl Raymond Faust; Paul Clifford Yates, both of Wilmington, Del.

[73] Assignee: E. I. DuPont de Nemours and Company, Wilmington, Del.

[22] Filed: Mar. 27, 1972

[21] Appl. No.: 238,478

[52] U.S. Cl. ............... 423/167, 423/158, 423/163, 423/319, 423/484
[51] Int. Cl. ...................... C22b 29/00, C01b 25/22
[58] Field of Search ........... 423/504, 505, 167, 319; 923/166

[56] References Cited
UNITED STATES PATENTS

| | | | |
|---|---|---|---|
| 2,899,292 | 8/1959 | Vickery | 423/309 |
| 3,391,992 | 7/1968 | Watson | 423/309 |
| 3,519,387 | 7/1970 | Henderson | 423/309 |
| 3,619,136 | 11/1971 | Case | 423/166 |
| 3,684,435 | 8/1972 | Lepomaa et al. | 423/167 |

*Primary Examiner*—Oscar R. Vertiz
*Assistant Examiner*—Brian E. Hearn

[57] ABSTRACT

The calcium, fluorine and phosphate values of calcium fluophosphate ores can be recovered by reacting the ores with phosphoric acid. The process is conducted by dissolving the ore in phosphoric acid solutions containing less F, Ca and $SO_4$ impurities than found in conventional wet process phosphoric acid. The reaction is conducted at temperatures and for periods of time sufficient to dissolve at least 75 percent of the fluorine and phosphate values of the ore, but insufficient to react the fluorides with the silica impurities present in the ore. The impurities are separated by filtration or centrifugation and the desired values are recovered.

2 Claims, No Drawings

PROCESS FOR TREATING FLUOPHOSPHATE ORES

BACKGROUND OF THE INVENTION

There is a rapidly expanding demand for fluoride based chemicals, both of the organic type such as fluorinated hydrocarbons, e.g., "Freon," and polytetrafluoroethylene resins, as well as for inorganic fluorides, such as aluminum fluoride and cryolite employed in the manufacture of metallic aluminum. The traditional raw material for these chemicals has been fluorspar, or calcium fluoride. Unfortunately, known reserves of high grade fluorspar ores have not expanded as rapidly as the demand for fluorine chemicals.

The only other potentially large sources of fluorine are the very extensive deposits of calcium fluophosphate ores. These ores are used in the manufacture of wet process phosphoric acid and phosphate fertilizers.

The art has taught the use of sulfuric acid or phosphoric acid with sulfuric acid to attack these ores to recover their calcium, fluorine, and phosphate values. The art approach proceeds slowly and results in the formation of fluosilicic acids. This acid is created by the reaction of the fluoride liberated with the silica impurities of the ore. The presence of this acid creates problems in the separation and recovery of the desired calcium, fluorine and phosphate values.

U.S. Pat. No. 3,619,136, discloses a process to preferentially dissolve the calcium and $P_2O_5$ content of phosphate ores in a recycle phosphoric acid which is saturated with fluoride and with other minor impurities, to leave an insoluble residue of calcium fluoride, silica, and iron and aluminum phosphates. After sedimentation to remove this residue, the patent teaches reaction with sulfuric acid to precipitate the calcium as gypsum and the recovery of a fluoride-saturated phosphoric acid for recycle and as a product.

SUMMARY OF THE INVENTION

We have discovered that the conventional acid attack on these calcium fluophosphate ores which contain silica impurities can be improved if no more than about 45 parts by weight of the ore per 100 parts by weight of acid (based on $P_2O_5$) is dissolved in 10 to 60 percent by weight aqueous phosphoric acid, (based on $P_2O_5$) at a temperature from 50° to 120° C. for a time sufficient to dissolve at least 75 percent of the fluorine and phosphate values but insufficient to react any appreciable amount of the fluoride liberated with the silica present in the ore.

The phosphoric acid used should be pure and not the conventional wet process phosphoric acid. Thus the acid should preferably contain no more than 0.3 percent by weight fluorine and no more than 30 percent of the equilibrium solubility of $CaSO_4$ at the acid strength employed. Preferably, the acid used should contain no more than 0.2 percent fluorine and most preferably less than 0.1 percent. In any event, the concentration should be lower than the saturation concentration of fluorine allowed by the solubility product of calcium fluoride under the reaction conditions of time, temperature, phosphate concentration, and calcium concentration existing during the attack.

This pure phosphoric acid under the time and temperature conditions set forth above preferentially dissolves the ore without dissolving the silica impurities present, thus fluorsilic acid is not formed to any harmful extent.

The impurities, e.g., silica, are separated by filtration or centrifugation and the fluorine, phosphate and calcium values are recovered as a solution in phosphoric acid free of silica contamination.

DESCRIPTION OF THE INVENTION

As set forth above, the basic concept of this invention involves the reaction of pure phosphoric acid with calcium fluophosphate ores without the formation of fluosilicates.

The phosphoric acid used in the process of the invention should contain no more than 0.3 percent fluorine and preferably less. No more than 30 percent and preferably less than 10 percent of the equilibrium solubility of $CaSO_4$ should be present in the phosphoric acid at the acid strength required. The phosphoric acid concentration, expressed as $P_2O_5$, should be between 10 and 60 percent. A concentration between 10 and 50 percent is preferred when an essentially silica-free product is desired.

The concentration of ore should be no more than about 45 parts by weight per 100 parts by weight of $P_2O_5$ in the acid. Higher ore concentrations would lead to incomplete solutions under the conditions necessary to supress the reaction of fluorine with silicates. The particle size of the ore should be that of conventionally ground ore but finely ground ore is preferred, e.g., less than 100 mesh.

The process of this invention can be conducted at a temperature range from 50° to 120° C. The preferred temperature range is from 60° to 110° C. Lower temperatures result in unnecessarily long reaction times and higher temperatures could lead to the formation of unwanted fluosilicates.

The reaction time varies inversely with temperature. The reaction time for this process can be from 5 minutes to 3 hours with the preferred time being from 10 minutes to 2 hours. The reaction time should be sufficient to dissolve at least 75 percent of the fluorine and phosphate values, but insufficient to react the $SiO_2$ impurities with fluorine. The time can easily be determined by analyzing the reaction solution at various time intervals for phosphate, calcium, and silica by techniques known in the art.

It should be understood that it is important for the purposes of this invention to minimize the time and temperature for contact of the attacking solution with the undissolved residue of silica following the substantial completion of the solubilization of the calcium, fluorine, and phosphate values of the ore. Prolonged contact beyond this point facilitates secondary reactions between the dissolved fluoride ions and the silica residue to form fluosilicic acid. This attack is generally promoted by higher temperatures, longer times, higher concentrations of phosphoric acid, and higher dissolved fluoride ion concentrations.

When one or more of these variables must be maintained at high values for reasons of economy, it becomes very important to minimize the others. For example, if a high $P_2O_5$ concentration and a high temperature are used, it is critical to employ very short attack times and/or a higher ratio of phosphoric acid to rock, which will lower the fluoride ion concentration.

Similarly, if a long attack time is to be used at a high ratio of rock to phosphoric acid, lower temperatures and lower $P_2O_5$ concentrations should be chosen.

For applications where the minimum silica content is very critical, it may even be desirable to sacrifice some of the fluorine and phosphate yield. For example, the attack may be carried out only to the point of recovering about 75 percent of the phosphate and fluorine values of the ore even though longer contact times and higher temperatures would give essentially quantitative recovery.

Following the reaction, the silica impurities can be removed by any conventional liquid/solid separation process, e.g., filtration, centrifugation, gravitational sedimentation, ultrafiltration, etc.

The process of this invention can be run batchwise or continuously. When run continuously, the phosphoric acid can be purified and recycled. The phosphoric acid can be purified by removing the calcium and fluorine values by selective precipitation, solvent extraction, or ion exchange to form solid, liquid, or volatile separate phases that can be removed by filtration, centrifugation, distillation and other known separation techniques.

The resulting phosphoric acid is essentially fluorine free and is low in iron and aluminum impurities. This acid is of sufficient purity that it can be employed for many end uses.

The process of this invention provides convenient means for recovering useful Ca, F and $P_2O_5$ values from the ore. The process is particularly useful in providing a source of dissolved fluorine that can be further processed by conventional chemical processes to furnish a source of HF. This is true since the fluorine is recovered from the process of the invention as a soluble fluoride ion, not as an insoluble precipitate which is mixed with other impurities, e.g., silica, alumina, iron.

For example, anhydrous hydrogen fluoride can be obtained in the following manner.

To a solution containing the phosphate, fluorine and calcium values can be added a solution of aluminum triphosphate in phosphoric acid and hydrofluoric acid and then heated to about 80° C. A precipitate will be formed which can be recovered by filtration; the recovered product will be $CaAlF_4(H_2PO_4)$. This product can then be reacted with concentrated sulfuric acid to produce anhydrous hydrogen fluoride, soluble aluminum sulfate and calcium sulfate. Example 6 describes this process in further detail.

Another embodiment, ammonium fluoride, can be added to the solution produced by the process of the invention to precipitate calcium fluoride and leave an ammonium phosphate solution. Calcium fluoride is used as a source of fluorine, a flux in open hearth steel furnaces and metal smelting, in ceramics production, in carbon electrodes and in many other ways. Ammonium phosphate is used in fertilizer production.

The following examples are offered to illustrate the process of the invention.

EXAMPLE 1

Four hundred grams of 30 percent by weight $P_2O_5$ solution prepared by mixing 205.1 g. of distilled water and 194.9 g of Reagent grade 85% $H_3PO_4$, were charged to a 1-liter flask equipped with a water-cooled reflux condenser. A small stream of nitrogen was introduced into the vapor space following the condenser and the vapors passed into a scrubber filled with distilled water with a pH of 5–6. Fifty grams of phosphate rock containing 8 to 9 percent by weight Si expressed as $SiO_2$ were then added to the flask and the temperature raised to 100° C and held there for 1½ hrs.

The reaction mixture was transferred hot to a tared filter funnel, filtered and the insoluble residue washed exhaustively on the filter with distilled water. the washed residue, still on the filter, was dried in a 110° C. vacuum oven to constant weight and weighed 6.9 grams, or 13.8 percent of the weight of the starting rock.

At the end of the experiment the water in the scrubber was still at pH 5–6, showing that no HF or $SiF_4$ had been liberated during the reaction.

EXAMPLE 2

Three hundred ninety-six grams of 30 percent by weight $P_2O_5$ solution prepared by mixing 203 g distilled $H_2O$ and 193 g of Reagent grade 85% $H_3PO_4$, were charged to a heated and agitated container. To this solution 50 g of phosphate rock containing 8 to 9% Si by weight expressed as $SiO_2$, 30% P as $P_2O_5$, 31% Ca, and 3.7% F was added and the temperature of the mixture raised to 100° C and held there for 1½ hours.

The reaction mixture was then filtered. Chemical analysis of the filtrate showed 0.065% Si.

The insoluble residue on the filter was exhaustively washed with distilled water, sucked dry on the filter, and placed in a 110°C vacuum oven overnight. The dry residue weighed 7.0 grams or 14 percent of the weight of the starting rock. Analysis of the dry residue showed 51.3 percent $SiO_2$, 5.3% $P_2O_5$, 20.2% Ca, and 2.3% F.

In this experiment a solution practically free of silica was prepared and the insoluble residue contained approximately 2.5 percent of the $P_2O_5$, 9.1 percent of the Ca, and 8.7 percent of the F present in the starting phosphate rock.

EXAMPLE 3

The experiment of Example 2 was repeated except that the reaction temperature was adjusted to 55°–60° C.

The chemical analysis of the filtrate showed less than 0.01 percent Si.

The washed and dried residue weighed 7.2 g, or 14.4 percent of the weight of the starting rock. Analysis of the dry residue showed 55.1 percent $SiO_2$, 13.3 percent $P_2O_5$, 17.5 percent Ca and 2.1 percent F.

Again a filtrate practically free of silica resulted and the insoluble residue contained 6.4 percent of the $P_2O_5$, 8.1 percent of the Ca, and 8.0 percent of the F present in the starting phosphate rock.

EXAMPLE 4

The experiment of Example 3 was repeated except that 597 g of 20 percent by weight $P_2O_5$ prepared by mixing 403 g of distilled $H_2O$ and 194 g of Reagent grade 85 percent $H_3PO_4$ was used.

The analysis of the filtrate showed 0.04% Si.

The washed and dried residue weighed 5.6 g, or 11.2 percent of the weight of the starting rock. Analysis of the dry residue was 67.3% $SiO_2$, 10.1% $P_2O_5$, 12.1% Ca and 2.2% F.

Again a filtrate substantially free of silica was obtained and the insoluble residue contained 3.8 percent of the $P_2O_5$, 4.4 percent of the Ca and 6.6 percent of the F present in the starting rock.

EXAMPLE 5

The experiment of Example 3 was repeated except that 1,194 g of 10 percent by weight $P_2O_5$ prepared by mixing 1,000 g of distilled $H_2O$ and 194 g of Reagent grade 85% $H_3PO_4$ was used.

The analysis of the filtrate showed less than 0.01% Si.

The washed and dried residue weighed 8.10 g, or 16.2 percent of the starting rock. Analysis of the dry residue was 49.4% $SiO_2$, 17.0% $P_2O_5$, 19.3 percent Ca, and 2.66 percent F.

A filtrate free of silica was obtained and the insoluble residue contained 9.2 percent of the $P_2O_5$, 10.1 percent of the Ca, and 11.6 percent of the F present in the starting rock.

EXAMPLE 6

Five hundred seventy-five grams of reagent grade 85 percent phosphoric acid were placed in a 1 liter Teflon beaker and heated to 100° C, to which were added approximately 10 mls of octyl alcohol as an antifoaming agent. A calcium fluorophosphate ore having the following chemical analyses, $P_2O_5$, 31.2 percent; calcium oxide, 44.8 percent; iron, 0.9 percent; aluminum, 0.8 percent; fluorine, 3.68 percent; $SiO_2$, 8.0 percent; magnesium, 0.3 percent; $CO_2$, 3.0 percent; sulfur, 0.3 percent; and $H_2O$, 1.4 percent, was added to the acid. One hundred thirty-four grams were added over a 4 minute time period and this was heated for an additional 6 minutes, at which time the temperature was 120° C. Five hundred twenty-one grams of water were stirred in over 10 minutes, and this dropped the temperature to 80° C. The solution was then filtered through a No. 41 Whatman filter paper. Fourteen hundred forty grams of filtrate were recovered (this includes the washings of the precipitate). The washings plus filtrate were analyzed and found to contain 0.26 percent fluorine, 0.35 percent aluminum, 0.06 percent iron, 37.6 percent $PO_4$, and 0.01 percent $SiO_2$. The cake, which weighed 14.91 grams, was analyzed and found to contain 0.27 percent iron, 0.60 percent aluminum, 1.66 percent fluorine, and, on separate analyses, 52.3 and 55.1 percent $SiO_2$, 12.7 percent calcium, with the remainder being $P_2O_5$ and water.

Essentially all of the silica contained in the original ore (within experimental error) was found in the filter cake, while, as shown from the analytical data, the overwhelming majority of the phosphate, fluorine, and calcium content of the ore was found in the filtrate plus washings.

The solution of filtrate and washing was used to prepare an essentially silica-free calcium-aluminum fluorophosphate in the following fashion.

Sixty g of a solution of aluminum triphosphate in phosphoric acid containing 0.1 mole of aluminum were mixed with 12.5 g of 48 percent hydrofluoric acid, to give 0.3 mole of fluorine, and this was diluted to 100 g with water and heated to 80° C. To this was slowly added 134 g of the solution described above which had also previously been heated to 80° C. A precipitate formed and the solution was cooled to 30° C and filtered through a coarse glass filter. The cake was washed with 100 cc of water which was combined with the filtrate. The cake was then washed with 100 mls of acetone and dried in an air oven. 8.2 Grams were recovered, and this was shown to be essentially silica-free, containing less than 0.03 percent $SiO_2$, and to have a very high fluorine content, 37.25 percent. Other chemical analyses indicated that this precipitate had the approximate composition $CaAlF_4(H_2PO_4)$. This high fluorine-containing cake was dried and reacted with concentrated sulfuric acid to liberate anhydrous hydrogen fluoride and form a calcium sulfate cake along with soluble aluminum sulfate. The calcium sulfate was filtered away and the aluminum sulfate solution can be employed for other purposes.

EXAMPLE 7

Three thousand eight hundred ninety-six grams of 85 percent reagent grade phosphoric acid were diluted to 8,000 grams with water and heated to 59° C. While this was stirred, 1,056 grams of the calcium fluorophosphate ore of Example 6 were added over a period of 10 minutes. This was allowed to stir with heating at 60° C. for a total of 1.5 hours. The solution resulting was then centrifuged.

The cake weighed 138 grams and consisted primarily of the silica impurities originally associated with the ore, along with small amounts of unreacted calcium phosphate ore.

EXAMPLE 8

Five hundred seventy-five grams of 85 percent phosphoric acid were heated to 110° C. and to this was slowly added 134 grams of the phosphate rock ore of Example 6. After 5 minutes at 110° C., 521 grams of water were added which lowered the temperature to 90° C., and the mixture was allowed to react for an additional 5 minutes and then filtered, and the product recovered. The resulting fluorophosphate mixture was analyzed and contained 0.334 percent fluorine. It contained substantially all of the calcium and phosphate values of the ore as in previous examples.

One hundred eleven grams of aluminum sulfate 18-hydrate were dissolved in 200 grams of 40% $P_2O_5$ phosphoric acid and heated to 95° C. Five hundred sixteen grams of the phosphate ore of Example 6 was divided into 10 equal parts and added alternately to the phosphoric acid aluminum sulfate heel with a solution containing 233 grams of water, 377 grams of 96 percent sulfuric acid, and 100 grams of 40 percent $P_2O_5$ phosphoric acid. The additions of ore and the above mixture of phosphoric and sulfuric acid in water were continued over a period of 70 minutes, while the temperature was maintained between 95° and 100° C. The reaction mixture was allowed to stir at 95° to 100° C. for 3 hours, and it was then removed, filtered, and washed. The resulting product was a solution of aluminum fluorophosphate and phosphoric acid which contained 1.42 percent fluorine, representing an 87.2 percent recovery of the fluorine in the ore. This mixture contained all the aluminum added as aluminum sulfate and 96 percent of the $P_2O_5$ content of the ore. The process of this paragraph is described in greater detail in assignee's copending application Ser. No. 169,077, filed Aug. 4, 1971, now abandoned.

To recover the fluorine values from both of these compositions and to obtain an essentially fluorine-free phosphoric acid for recycle and for use, 500 grams of the aluminum fluorophosphate mixture were heated to 60° C. and to this were added 347 grams of the calcium fluorophosphate mixture. This formed a clear solution. Three times the total volume, or 2,250 mls of methyl alcohol was then added over a period of 15 to 20 minutes, and this was allowed to stand for 1 hour at 50° C. The resulting precipitate of calcium aluminum fluorophosphate was filtered and washed with methanol and vaccum dried at 70° C. for approximately 2 hours.

Chemical analysis of this precipitate showed that 95.7 percent of the total fluorine present in both of the reacting solutions had been recovered as a calcium aluminum fluorophosphate product. This was subsequently reacted with an excess of concentrated sulfuric acid to liberate anhydrous hydrofluoric acid and to form calcium sulfate and regenerate the aluminum sulfate substantially quantitatively which had been used in the ore attack according to the process of application Ser. No. 169,077. After filtering to remove the calcium sulfate, the mixture of aluminum sulfate, phosphoric acid and excess sulfuric acid can be used to attack a further batch of ore according to the process of application Ser. No. 169,077.

The filtrate containing methanol and phosphoric acid was distilled to recover the methanol, which was recycled. The still residue consisting of essentially pure phosphoric acid was used to recycle and attack more ore according to the process of this case. A fluorine analysis showed that this phosphoric acid contained only 0.14 percent fluorine, indicating the purity obtainable. This very low fluorine-containing phosphoric acid was therefore satisfactory for dissolving additional phosphate rock according to the process of this case.

What is claimed is:

1. In the process for recovering the calcium, fluorine, and phosphate values of calcium fluorphosphate ores by acid attack followed by separation of the impurities and recovery of the desired fluorine, phosphate and calcium values, the improvement comprising dissolving no more than about 45 parts by weight of said ore per 100 parts by weight acid, based on $P_2O_5$, in 10 to 60 percent by weight aqueous phosphoric acid, based on $P_2O_5$, the phosphoric acid containing no more than 0.3 percent by weight fluorine and no more than 30 percent of the equilibrium solubility of $CaSO_4$ at the acid strength employed, at a temperature of from 50° to 120° C. for a time varying from 3 hours at 50° C. and 5 minutes at 120° C., said time being sufficient to dissolve about 75 percent of the fluorine and phosphate values but insufficient to react any appreciable amount of the fluoride liberated with the silica in said ore.

2. The process of claim 1 wherein the acid attack is for 5 minutes to 3 hours at 60° to 110° C. and the acid employed has a concentration of 10 to 50 percent.

* * * * *